(12) United States Patent
Stribaek et al.

(10) Patent No.: US 7,711,763 B2
(45) Date of Patent: May 4, 2010

(54) MICROPROCESSOR INSTRUCTIONS FOR PERFORMING POLYNOMIAL ARITHMETIC OPERATIONS

(75) Inventors: Morten Stribaek, Frederiksberg (DK); Kevin D. Kissell, Le Bar sur Loup (FR); Pascal Paillier, Paris (FR)

(73) Assignee: MIPS Technologies, Inc., Sunnyvale, CA (US)

( * ) Notice: Subject to any disclaimer, the term of this patent is extended or adjusted under 35 U.S.C. 154(b) by 516 days.

(21) Appl. No.: 09/788,684

(22) Filed: Feb. 21, 2001

(65) Prior Publication Data

US 2002/0116428 A1 Aug. 22, 2002

(51) Int. Cl.
*G06F 7/00* (2006.01)
(52) U.S. Cl. ................................. 708/492
(58) Field of Classification Search ........... 708/492; 712/219, 218
See application file for complete search history.

(56) References Cited

U.S. PATENT DOCUMENTS

| 3,614,406 | A | 10/1971 | Brown |
| 3,642,744 | A | 2/1972 | Moberly et al. |
| 3,654,621 | A | 4/1972 | Bock et al. |
| 3,916,388 | A | 10/1975 | Shrimp et al. |
| 4,023,023 | A | 5/1977 | Bourrez et al. |
| 4,109,310 | A | 8/1978 | England et al. |
| 4,126,896 | A | 11/1978 | Yamazaki |
| 4,128,880 | A | 12/1978 | Cray, Jr. |
| 4,130,880 | A | 12/1978 | Nutter |
| 4,173,041 | A | 10/1979 | Dvorak et al. |
| 4,219,874 | A | 8/1980 | Gusev et al. |
| 4,302,820 | A | 11/1981 | Struger et al. |
| 4,307,445 | A | 12/1981 | Tredennick et al. |
| 4,317,170 | A | 2/1982 | Wada et al. |
| 4,394,736 | A | 7/1983 | Bernstein et al. |
| 4,396,982 | A | 8/1983 | Wada et al. |
| 4,434,462 | A | 2/1984 | Guttag et al. |
| 4,491,910 | A | 1/1985 | Caudel et al. |
| 4,495,598 | A | 1/1985 | Vahlstrom et al. |
| 4,507,731 | A | 3/1985 | Morrison |
| 4,511,990 | A | 4/1985 | Hagiwara et al. |
| 4,520,439 | A | 5/1985 | Liepa |
| 4,538,239 | A | 8/1985 | Magar |
| 4,583,199 | A | 4/1986 | Boothroyd et al. |
| 4,586,130 | A | 4/1986 | Butts, Jr. et al. |
| 4,771,463 | A * | 9/1988 | Beeman ...................... 380/46 |

(Continued)

FOREIGN PATENT DOCUMENTS

DE 196 44 688 A1 4/1998

(Continued)

OTHER PUBLICATIONS

Koc, C. K., and Acar, T., Fast Software Exponentiation in GF(2k), Proceedings of the 13th IEEE Symposium on Computer Arithmetic, Jul. 6-9, 1997, pp. 225-231.*

(Continued)

*Primary Examiner*—Richard Ellis
(74) *Attorney, Agent, or Firm*—Sterne, Kessler, Goldstein & Fox P.L.L.C.

(57) ABSTRACT

Polynomial arithmetic instructions are provided in an instruction set architecture (ISA). A multiply-add-polynomial (MADDP) instruction and a multiply-polynomial (MULTP) instruction are provided.

55 Claims, 3 Drawing Sheets

U.S. PATENT DOCUMENTS

| | | |
|---|---|---|
| 4,773,006 A | 9/1988 | Kinoshita et al. |
| 4,809,212 A | 2/1989 | New et al. |
| 4,811,215 A | 3/1989 | Smith |
| 4,814,976 A | 3/1989 | Hansen et al. |
| 4,825,363 A | 4/1989 | Baumann et al. |
| 4,829,380 A | 5/1989 | Iadipaolo |
| 4,847,801 A | 7/1989 | Tong |
| 4,852,037 A | 7/1989 | Aoki |
| 4,860,192 A | 8/1989 | Sachs et al. |
| 4,868,777 A | 9/1989 | Nishiyama et al. |
| 4,878,174 A | 10/1989 | Watkins et al. |
| 4,879,676 A | 11/1989 | Hansen |
| 4,884,197 A | 11/1989 | Sachs et al. |
| 4,891,781 A * | 1/1990 | Omura .................. 708/670 |
| 4,899,275 A | 2/1990 | Sachs et al. |
| 4,924,435 A | 5/1990 | Brunvand et al. |
| 4,928,223 A | 5/1990 | Dao et al. |
| 4,949,250 A | 8/1990 | Bhandarkar et al. |
| 4,992,934 A | 2/1991 | Portanova et al. |
| 5,005,118 A | 4/1991 | Lenoski |
| 5,073,864 A | 12/1991 | Methvin et al. |
| 5,136,696 A | 8/1992 | Beckwith et al. |
| 5,150,290 A | 9/1992 | Hunt |
| 5,177,701 A | 1/1993 | Iwasa |
| 5,181,183 A | 1/1993 | Miyazaki |
| 5,185,713 A | 2/1993 | Kobunaya |
| 5,193,202 A | 3/1993 | Jackson et al. |
| 5,220,656 A | 6/1993 | Itomitsu et al. |
| 5,222,244 A | 6/1993 | Carbine et al. |
| 5,235,686 A | 8/1993 | Bosshart |
| 5,280,439 A | 1/1994 | Quek et al. |
| 5,280,593 A | 1/1994 | Bullions, III et al. |
| 5,299,147 A | 3/1994 | Holst |
| 5,392,228 A | 2/1995 | Burgess et al. |
| 5,392,408 A | 2/1995 | Fitch |
| 5,396,502 A | 3/1995 | Owsley et al. |
| 5,418,915 A | 5/1995 | Matuda et al. |
| 5,452,241 A | 9/1995 | Desrosiers et al. |
| 5,479,620 A | 12/1995 | Kiyohara et al. |
| 5,499,299 A | 3/1996 | Takenaka et al. |
| 5,502,829 A | 3/1996 | Sachs |
| 5,513,366 A | 4/1996 | Agarwal et al. |
| 5,517,438 A | 5/1996 | Dao-Trong et al. |
| 5,537,562 A | 7/1996 | Gallup et al. |
| 5,537,629 A | 7/1996 | Brown et al. |
| 5,550,768 A | 8/1996 | Ogilvie et al. |
| 5,559,974 A | 9/1996 | Boggs et al. |
| 5,560,028 A | 9/1996 | Sachs et al. |
| 5,581,773 A | 12/1996 | Glover |
| 5,590,345 A | 12/1996 | Barker et al. |
| 5,598,571 A | 1/1997 | Gallup et al. |
| 5,664,136 A | 9/1997 | Witt et al. |
| 5,666,298 A | 9/1997 | Peleg et al. |
| 5,669,010 A | 9/1997 | Duluk, Jr. |
| 5,671,401 A | 9/1997 | Harrell |
| 5,673,407 A | 9/1997 | Poland et al. |
| 5,696,937 A | 12/1997 | White et al. |
| 5,713,035 A | 1/1998 | Ferrell et al. |
| 5,717,910 A | 2/1998 | Henry |
| 5,721,892 A | 2/1998 | Peleg et al. |
| 5,726,927 A | 3/1998 | Wolrich et al. |
| 5,729,554 A | 3/1998 | Weir et al. |
| 5,729,724 A | 3/1998 | Sharangpani et al. |
| 5,729,728 A | 3/1998 | Colwell et al. |
| 5,734,600 A | 3/1998 | Dieffenderfer et al. |
| 5,734,874 A | 3/1998 | Van Hook et al. |
| 5,740,340 A | 4/1998 | Lurcell et al. |
| 5,748,979 A * | 5/1998 | Trimberger .............. 712/37 |
| 5,752,071 A | 5/1998 | Tubbs et al. |
| 5,758,176 A | 5/1998 | Agarwal et al. |
| 5,761,523 A | 6/1998 | Wilkinson et al. |
| 5,768,172 A | 6/1998 | Derby |
| 5,774,709 A | 6/1998 | Worrell |
| 5,778,241 A | 7/1998 | Bindloss et al. |
| 5,781,457 A | 7/1998 | Cohen et al. |
| 5,784,602 A | 7/1998 | Glass et al. |
| 5,790,827 A | 8/1998 | Leung |
| 5,793,661 A | 8/1998 | Dulong et al. |
| 5,794,003 A | 8/1998 | Sachs |
| 5,796,973 A | 8/1998 | Witt et al. |
| 5,798,923 A | 8/1998 | Laskowski |
| 5,809,294 A | 9/1998 | Ando |
| 5,812,147 A | 9/1998 | Van Hook et al. |
| 5,812,723 A | 9/1998 | Ohtsu et al. |
| 5,815,695 A | 9/1998 | James et al. |
| 5,815,723 A | 9/1998 | Wilkinson et al. |
| 5,819,117 A | 10/1998 | Hansen et al. |
| 5,822,606 A | 10/1998 | Morton |
| 5,838,984 A | 11/1998 | Nguyen et al. |
| 5,838,986 A | 11/1998 | Garg et al. |
| 5,848,255 A | 12/1998 | Kondo |
| 5,848,269 A | 12/1998 | Hara |
| 5,850,452 A | 12/1998 | Sourgen et al. |
| 5,852,726 A | 12/1998 | Lin et al. |
| 5,864,703 A | 1/1999 | Van Hook et al. |
| 5,867,682 A | 2/1999 | Witt et al. |
| 5,875,336 A | 2/1999 | Dickol et al. |
| 5,875,355 A | 2/1999 | Sidwell et al. |
| 5,880,984 A | 3/1999 | Burchfiel et al. |
| 5,881,307 A | 3/1999 | Park et al. |
| 5,887,183 A | 3/1999 | Agarwal et al. |
| 5,892,960 A | 4/1999 | Seide |
| 5,918,031 A | 6/1999 | Morrison et al. |
| 5,922,066 A | 7/1999 | Cho et al. |
| 5,926,642 A | 7/1999 | Favor |
| 5,933,650 A | 8/1999 | Van Hook et al. |
| 5,936,872 A | 8/1999 | Fischer et al. |
| 5,944,776 A | 8/1999 | Zhang et al. |
| 5,953,241 A | 9/1999 | Hansen et al. |
| 5,960,012 A | 9/1999 | Spracklen |
| 5,961,629 A | 10/1999 | Nguyen et al. |
| 5,996,056 A | 11/1999 | Volkonsky |
| 5,996,062 A | 11/1999 | Sachs |
| 5,996,066 A | 11/1999 | Yung |
| 6,006,316 A | 12/1999 | Dinkjian |
| 6,009,261 A | 12/1999 | Scalzi et al. |
| 6,009,450 A | 12/1999 | Dworkin et al. |
| 6,026,420 A * | 2/2000 | DesJardins et al. ......... 708/492 |
| 6,035,120 A | 3/2000 | Ravichandran |
| 6,035,316 A | 3/2000 | Pelleg et al. |
| 6,035,317 A | 3/2000 | Guy |
| 6,041,403 A | 3/2000 | Parker et al. |
| 6,058,465 A | 5/2000 | Nguyen |
| 6,058,500 A * | 5/2000 | DesJardins et al. ......... 714/781 |
| 6,065,115 A | 5/2000 | Sharangpani et al. |
| 6,066,178 A | 5/2000 | Bair et al. |
| 6,067,615 A | 5/2000 | Upton |
| 6,073,154 A | 6/2000 | Dick |
| 6,078,941 A | 6/2000 | Jiang et al. |
| 6,088,783 A | 7/2000 | Morton |
| 6,122,738 A * | 9/2000 | Millard .................. 713/187 |
| 6,128,726 A | 10/2000 | LeComec |
| 6,138,229 A | 10/2000 | Kucukcakar et al. |
| 6,141,421 A | 10/2000 | Takaragi et al. |
| 6,141,786 A | 10/2000 | Cox et al. |
| 6,145,077 A | 11/2000 | Sidwell et al. |
| 6,154,834 A | 11/2000 | Neal et al. |
| 6,172,494 B1 | 1/2001 | Feuser |
| 6,181,729 B1 * | 1/2001 | O'Farrell .................. 375/130 |
| 6,185,668 B1 | 2/2001 | Arya |
| 6,192,491 B1 | 2/2001 | Cashman et al. |
| 6,199,087 B1 | 3/2001 | Blake et al. |
| 6,199,088 B1 | 3/2001 | Weng et al. |
| 6,233,597 B1 | 5/2001 | Tanoue et al. |

| | | | |
|---|---|---|---|
| 6,243,732 B1 | 6/2001 | Arakawa et al. | |
| 6,263,429 B1 | 7/2001 | Siska | |
| 6,266,758 B1 | 7/2001 | Van Hook et al. | |
| 6,279,023 B1 | 8/2001 | Weng et al. | |
| 6,282,635 B1 | 8/2001 | Sachs | |
| 6,292,883 B1 | 9/2001 | Augusteijn et al. | |
| 6,295,599 B1 | 9/2001 | Hansen et al. | |
| 6,298,438 B1 | 10/2001 | Thayer et al. | |
| 6,314,445 B1 | 11/2001 | Poole | |
| 6,336,178 B1 | 1/2002 | Favor | |
| 6,349,318 B1 | 2/2002 | Vanstone et al. | |
| 6,349,377 B1 | 2/2002 | Lindwer | |
| 6,397,241 B1 | 5/2002 | Glaser et al. | |
| 6,421,817 B1 | 7/2002 | Mohan et al. | |
| 6,425,124 B1 | 7/2002 | Tominaga et al. | |
| 6,453,407 B1 | 9/2002 | Lavi et al. | |
| 6,480,605 B1 | 11/2002 | Uchiyama et al. | |
| 6,480,872 B1 | 11/2002 | Choquette | |
| 6,513,054 B1 | 1/2003 | Carroll | |
| 6,523,054 B1* | 2/2003 | Kamijo | 708/492 |
| 6,587,939 B1 | 7/2003 | Takano | |
| 6,615,366 B1 | 9/2003 | Grochowski et al. | |
| 6,625,726 B1 | 9/2003 | Clark et al. | |
| 6,625,737 B1 | 9/2003 | Kissell | |
| 6,651,160 B1 | 11/2003 | Hays | |
| 6,658,561 B1 | 12/2003 | Benayoun et al. | |
| 6,711,602 B1 | 3/2004 | Bhandal et al. | |
| 6,760,742 B1 | 7/2004 | Hoyle | |
| 6,892,293 B2 | 5/2005 | Sachs et al. | |
| 6,952,478 B2 | 10/2005 | Lee et al. | |
| 6,976,178 B1 | 12/2005 | Kissell | |
| 7,003,715 B1* | 2/2006 | Thurston | 714/782 |
| 7,142,668 B1 | 11/2006 | Kogure | |
| 7,162,621 B2 | 1/2007 | Kissell | |
| 7,181,484 B2 | 2/2007 | Kissell et al. | |
| 2001/0052118 A1 | 12/2001 | Steinbusch | |
| 2002/0013691 A1 | 1/2002 | Warnes | |
| 2002/0062436 A1 | 5/2002 | Van Hook et al. | |
| 2002/0069402 A1 | 6/2002 | Nevill et al. | |
| 2002/0116428 A1 | 8/2002 | Kissell | |
| 2003/0172254 A1 | 9/2003 | Mandavilli et al. | |
| 2006/0190518 A1 | 8/2006 | Ekner et al. | |

FOREIGN PATENT DOCUMENTS

| | | |
|---|---|---|
| EP | 0 681 236 A1 | 11/1995 |
| EP | 0 757 312 A1 | 2/1997 |
| EP | 0 681 236 B1 | 11/2000 |
| JP | 10-11289 A | 1/1998 |
| JP | 11-003226 | 1/1999 |
| JP | 11-174955 | 7/1999 |
| JP | 2000-293507 | 10/2000 |
| JP | 2000-321979 | 11/2000 |
| WO | WO 97/07450 A1 | 2/1997 |
| WO | WO 97/08608 A1 | 3/1997 |

OTHER PUBLICATIONS

Lijun Gao, Sarvesh Shrivastava, Hanbo Lee, Gerald E. Sobelman, A Compact Fast Variable Size Elliptic Curve Cryptosystem Coprocessor, Proc. of the 7th Annual IEEE Symposium on Field-Programmable Custom Computing Machines, Apr. 21-23, 1999, pp. 304-305.*
Tanenbaum, Andrew S., Structured Computer Organization, Prentice-Hall, Inc. 1984, pp. 10-12.*
Digital Equipment Corporation, VAX11/780 Architecture Handbook, 1977. pp. 6-26, 6-27, 6-30, and 6-31.*
Galois Field Arithmetic Library, www.partow.net/projects/galois/ , Jan. 2, 2006.*
Wikipedia article, "Finite field arithmetic", www.wikipedia.com, author unknown, retrieved Jul. 30, 2008.*
Wikibooks article, "Data Coding Theory/Modulo-2 Arithmetic", author unknown, retrieved Jul. 30, 2008.*

Geraldo Orlando et al., *A High-Performance Reconfigurable Elliptic Curve Processor for GF ($2^m$)* *, C.K. Koc and C. Paar (Eds.): CHES 2000, LNCS 1965, pp. 41-56, 2000.
Erkay Savas et al., *A Scalable and Unified Multiplier Architecture for Finite Fields GF(p) and GF ($2^m$)* *, C.K. Koc and C. Paar (Eds.): CHES 2000, LNCS 1965, pp. 277-292, 2000.
Zhijie Shie et al., *Bit Permutation Instructions for Accelerating Software Cryptography*, Proceedings of the IEEE International Conference on Application-specific Systems, Architectures and Processors, Jul. 10-12, 2000, Boston, Massachusetts, USA, pp. 138-148.
Jae Wook Chung et al., *Fast Implementation of Elliptic Curve Defined over GF($p^m$) on CalmRISC with MAC2424 Coprocessor*, C.K. Koc and C. Paar (Eds.): CHES 2000, LNCS 1965, pp. 57-70, 2000.
Darrel Hankerson et al., *Software Implementation of Elliptic Curve Cryptography over Binary Fields*, C.K. Koc and C. Paar (Eds.): CHES 2000, LNCS 1965, pp. 1-24, 2000.
Marc Joye et al., *Efficient Generation of Prime Numbers*, C.K. Koc and C. Paar (Eds.): CHES 2000, LNCS 1965, pp. 340-354, 2000.
Souichi Okada et al., *Implementation of Elliptic Curve Crytographic Coprocessor over GF ($2^m$) on an FPGA*, C.K. Koc and C. Paar (Eds.): CHES 2000, LNCS 1965, pp. 25-40, 2000.
Digital Equipment Corporation, VAX11 780 Architecture Handbook, 1977, p. 6-39 to 6-41.
*A236 Parallel Digital Signal Processor Chip Programmer's Reference Manual*, Oxford Micro Devices, Inc., 1994, 195 pages (Bates Nos. L11184-L11378).
*DSP56000 24-Bit Digital Signal Processor Family Manual*, Motorola, Inc., 1995, 638 pages (Bates Nos. L08722-L09359).
*i860™ Microprocessor Family Programmer's Reference Manual*, Intel Corporation, 1992, 79 pages (Bates Nos. L09361-L09439).
*IEEE Standard for Binary Floating-Point Arithmetic*, IEEE, 1985, pp. i-vi and 1-14.
Koc, C.K., and Acar, T., "Montgomery Multiplication in GF($2^k$)," Proceedings of Third Annual Workshop on Selected Areas in Cryptography, pp. 95-106, Queens University, Kingston, Ontario, Canada, Aug. 15-16, 1996 (13 pages).
*TMS320C1x/C2x/C2xx/C5x Assembly Language Tools User's Guide*, Texas Instruments, Mar. 1995, 483 pages (Bates Nos. L07916-L08398).
*TMS320C5x General-Purpose Applications User's Guide*, Texas Instruments, Jul. 1997, 167 pages (Bates Nos. L08399-L08565).
*VIS™ Instruction Set User's Manual*, Sun Microsystems, Inc., 1997, pp. i-xii and 1-136.
Kutler , Jeffrey, *Smart Cards: Even Abundant Security Features Don't Spur Smart Card Buy-I*,. American Banker, vol. 163, No. 221, Nov. 18, 1998, *available in* Am. Banker 11998 WL 13326041 (3 pages).
*STMicroelectronics And Gemplus Announce Smart Card Security Certification Including Hardware And Software, EDP Weekly's* IT Monitor, vol. 42, Issue 13, Apr. 2, 2001, *available in* EDP Wkly. 42001 WL 14018034 (3 pages).
*Can Silicon Stop the Smartcard Hackers?* Electronic Times, Feb. 15, 1999, available in Electronics Times 321999 WL 9348105 (2 pages).
*STMicroelectronics And Gemplus Announce Smart Card Security Certification Including Hardware And Software*. Business Wire, Mar. 29, 2001, *available in* WESTLAW, Mar. 29, 2001 Bus. Wire 02:05:00 (3 pages).
Vollmer, A., *Security ICs Are Targeting Consumer Applications*, Electronic Design, vol. 48, Issue 23, Nov. 6, 2000, *available in* Electronic Design 1052000 WL 14003957 (13 pages).
Coron, J.-S. and Goubin, L., "On Boolean and Arithmetic Masking Against Differential Power Analysis," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 231-237, Springer-Verlag, Berlin/Heidelberg, Germany (2000).
Hasan, M. Anwar, "Power Analysis Attacks and Algorithmic Approaches to their Countermeasures for Koblitz Curve Cryptosystems," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 93-108, Springer-Verlag, Berlin/Heidelberg, Germany (2000).

Kato, T. et al., "A Design for Modular Exponentiation Coprocessor in Mobile Telecommunication Terminals," in *Proceedings of Second International Workshop on Cryptographic Hardware and Embedded Systems. CHES 2000* (Eds., C.K. Koc, and C. Paar), Worcester, Massachusetts, USA, Aug. 17-18, 2000, pp. 216-228, Springer-Verlag. Berlin/Heidelberg, Germany (2000).

Mayer-Sommer, R., "Smartly Analyzing the Simplicity and the Power of Simple Power Analysis on Smartcards," in Proceedings of Second International Workshop on Cryptographic Hardware and Embedded Systems, CHES 2000 (Eds., C.K. Koc, and C. Paar), Worcester, Massachusetts, USA. Aug. 17-18, 2000, pp. 78-92, Springer-Verlag, Berlin/Heidelberg. Germany (2000).

Naccache, D. and Tunstall. M. "How to Explain Side-Channel Leakage to Your Kids." In *Proceedings of Second International Workshop on Cryptographic Hardware and Embedded Systems, CHES 2000* (Eds., C.K. Koc and C. Paar), Worcester, Massachusetts. USA, Aug. 17-18, 2000, pp. 229-230 Springer-Verlag, Berlin/Heidelberg, Germany (2000).

Shamir. A., "Protecting Smart Cards from Passive Power Analysis with Detached Power Supplies," in *Proceedings of Second International Workshop on Cryptographic Hardware and Embedded Systems. CHES 2000* (Eds., C.K. Koc and C. Paar), Worcester, Massachusetts, USA, Aug. 17-18, 2000, pp. 71-77 Springer-Verlag, Berlin/Heidelberg, Germany (2000).

Weingart, S.H., "Physical Security Devices for Computer Subsystems: A Survey of Attacks and Defenses," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 302-317, Springer-Verlag, Berlin/Heidelberg, Germany (2000).

Kocher, P. et al., "Differential Power Analysis," in *Advances in Cryptology - Proceedings of 19th Annual International Cryptology Conference, CRYPTO '99* (Ed. Michael I. Wiener), Santa Barbara, California, USA, Aug. 15-19, 1999, Springer-Verlag, Berlin/Heidelberg, Germany (1999) pp. 388-397.

Daemen, J. et al., "Bitslice Ciphers and Power Analysis Attacks," presented at *Fast SoftwareEncryption Workshop 2000, New York, New York, USA*, Apr. 10-12, 2000 (16 pages).

Clavier, C. et at "Differential Power Analysis in the Presence of Hardware Countermeasures," in *Proceedings of Second International Workshop on Cryptographic Hardware and Embedded Systems, CHES2000* (Eds., C.K. Koc and C. Paar), Worcester, Massachusetts, USA, Aug. 17-18, 2000, pp. 252-263 Springer-Verlag, Berlin/Heidelberg, Germany (2000).

Shi, Z., et al., "Bit Permutation Instructions for Accelerating Software Cryptography," Proceedings of the IEEE International Conference on Application-specific Systems, Architectures and Processors, pp. 138-148, Boston, MA (Jul. 10-12, 2000).

Marketing literature from Philips Semiconductors, "On the Move - Philips Semiconductors and IBM Research to Co-develop Secure Smart Cards" [online]. Feb. 1999, Document order No. 9397.750. 05157, [Retrieved on Feb. 1, 2006]. Retrieved from the Internet: <URL:http:/www.semiconductors.philips.com/acrobat download/literature/9397/75005157.pdf>.

Philips Semiconductors Short Form Specification, "P16VVX064 SmartXA-Family, Secure 16-bit Smart Card Controller," Revision 1.1 [online]. Feb. 2001, pp. 1-11 [Retrieved on Feb. 1, 2006]. Retrieved from the Internet: <URL: httn://www.semiconductors.philips.com/acrobat download/other/identification/sfs052411.pdf>.

Certification Report BSI-DSZ-CC-0203-2003 for Philips Smart Card Controller P16WX064VOC [online]. Philips Semiconductors GmbH [Retrieved on Feb. 1, 2006]. Retrieved from the Internet: <URL: http://www.bsi.bund.de/zertifiz/zert/reporte/0203a.pdf>.

"Security Target BSI-DSZ-CC-0203, Version 1.1, Jan. 24, 2003, Evaluation of the Philips Pl6WX064VOC Secure 16-bit Smart Card Controller" [online]. Philips Semiconductors GmbH, pp. 1-74 [Retrieved on Feb. 1, 2006]. Retrieved from the Internet: <URL: http://www.commoncriteriaportal.org/public/files/epfiles/0203b.pdf>.

Case, B., "Superscalar Techniques: SuperSPARC vs. *88110*", *Microprocessor Report*, vol. 5, No. 22, Dec. 4,1991, pp. 1 and 6-11.

Diefendorff, K., "The *88110: A Superscalar Microprocessor with Graphics Support*" (Motorola), Microprocessor Forum, Nov. 1991, 20 pages (Bates Nos. L00622-00641).

Eyre, J., et al., "Infineon's TriCore Tackles DSP," *Microprocessor Report*, Apr. 19, 1999, pp. 12-14.

Feigel, C.P., "TI Introduces Four-Processor DSP Chip," *Microprocessor Report*, Mar. 28, 1994, pp. 22-25.

Gwennap, L., "Intel's MMX Speeds Multimedia," *Microprocessor Report*, MicroDesign Resources, vol. 10, No. 3, Mar. 5, 1996, 6 Pages.

Gwennap, L., "New Multimedia Chips to Enter the Fray," Microprocessor Report, MicroDesign Resources, vol. 10, No. 13, Oct. 1996, p. 9.

Halfhill, T.R. And Belgard, R., "Mips vs. Lexra: Definitely Not Aligned," *Microprocessor Report*, vol. 13, No. 16, Dec. 6, 1999, pp. 1-5.

Heinrich, J., *MIPS R4000 Microprocessor User's* Manual, Second Edition, MIPS Technologies, Inc., 1994, pp. 154.

Killian, E., "MIPS Extensions for Digital Media," Microprocessor Forum, Oct. 22-23, 1996, pp. 1-5.

Turley, J., "Siemens TriCore Revives CISC Techniques," *Microprocessor Report*. MicroDesign Resources, Nov. 17, 1997, pp. 13-16.

Weiss, R., *ARM Piccolo Mixes ARM RISC with DSP*, at http://ww.estd.com/Editorial/1996/11/Briefs/arm.html, 1 page (Nov. 1996).

*601 First Silicon*, at http://www.mot.com/SPSPowerPC/library/press_releases/601_First_Silicon.html, 2 pages (Oct. 1, 1992).

*AN1214: MC881 10 64-bit External Bus Interface to 16-bit EPROM*, at htto://www.mot-sps.com/lit/html/anL214.html, 1 page (Jan. 24, 1997).

*DSP56002 24-Bit Digital Signal Processor User's Manual*, Motorola, Inc., 1995, 386 pages (Bates Nos. L07277-L07662).

*DSP56002/DSP56L002 Motorola Semiconductor Product Information*, Motorola, Inc., 1994, 3 pages (Bates Nos. L07913-L07915).

*DSP56002 Semiconductor Technical Data*, Motorola, Inc., 1996, 110 pages (Bates Nos. L07803-L07912).

*EB162: Programming Tips (MC88110)*, at http://www.mot-sps.com/lit/html/eb162.html, 1 page (Jan. 24, 1997).

Hardware Implications of *xmem as a st followed by a ld, Motorola Semiconductor Engineering Bulletin*, Motorola, Sep. 1992, 5 pages.

Interrupt Latency in the MC8110, *Motorola Semiconductor Engineering Bulletin*, Motorola, 1992, pp. 1, 2 and 4-9.

*An Introduction to Thumb™*, Version 2.0, Advanced RISC Machines, Mar. 1995, 29 pages.

*Lexra Announces Industry's First RISC-DSP Core Based on MIPS® Instruction Set Architecture*, at http://www.lexra.com/pr_990505.html, 3 pages (May 5, 1999).

*Lexra Announces the Fastest 32-BIT RISC Core to Execute MIPS® Instructions*, at http://www.lexra. com/pr_990719.html, 2 pages (Jul. 19, 1999).

*Lexra Announces the First Mainstream 32-bit RISC Core In a Programmable Logic Device*, at http://www.lexra.com/pr_981005.html, 3 pages (Oct. 5, 1998).

*Lexra Announces its LX4080 Evaluation System is Proven and Available for Production*, at http://www.lexra.com/pr_980720.html, 2 pages (Jul. 20, 1998).

*Lexra Announces LX4080 Embedded RISC Processor Core, Delivering High Performance &executes MIPS-I instructions set*, at http://www.lexra.com/pr980112.html, 2 pages (Jan. 12, 1998).

*Lexra Announces LX4080 SmoothCore™ Silicon Proven RISC Core*, at http://www.lexra.com/pr_980323.html, 3 pages (Mar. 23, 1998).

*Lexra Announces Next Generation Embedded RISC Core*, at http://www.lexra.com/pr_990111.html, 3 pages, (Jan. 11, 1999).

*Lexra ASYM-LX Instruction Set Simulator Product Brief*, date unknown, 2 pages.

*Lexra ASYM-L XSimulator/FIR Filter Demo*, date unknown, 5 pages.

*Lexra Command Line User Environment (CLUE) for ASYM-LX User's Guide*, Revision 1.1, Jan. 28, 2000, pp. 1-32.

*Lexra [Products]*, at http://www.lexra.com/lx-products2.html, 2 pages (Copyright 1998-1999).

Lexra Rolls Out Second MIPS Core (Lexra LX4180) (Product Announcement), *Microprocessor Report*, Jan. 28, 1999, 1 page (printed from West database).

*LX4080*, at http://www.lexra.com/lx4080.html, 8 pages (Copyright 1998-1999).
*LX4080P*, at http://www.lexra.com/lx4080p.html, 6 pages (Copyright 1998-1999).
*LX4280*, at http://www. lexra.com/lx4280.html, 2 pages (Copyright 1998-1999).
*LX4280 Fills* Lexra's Midrange (MIPS-compatible embedded processor core) (Product Announcement), *Microprocessor Report*, Aug. 2, 1999, 1 page (printed from West database).
*LX5280*, at http://www. lexra.com/lx5280.html, 2 pages (Copyright 1998-1999).
*MC88110/410DH/AD: MC88410/MC88410 Designer's Handbook*, at http://www.mot-sps.com/lit/html/mc88110410dhad.html, 1 page (Jan. 24, 1997).
*MC88110UM/AD: MC88110 Second Generation RISC Microprocessor User's Manual*, at http://www.mot-sps.com/lit/html/mc88110umad.html, 1 page (Jan. 24, 1997).
*MC88410UM/AD: MC88410 Secondary Cache Controller User's Manual*, at http://www.mot-sps.com/lit/html/mc88410umad.html, 1 page (Jan. 24, 1997).
*Microprocessor Devices Reliability Monitor Report: Third Quarter 1997*, Motorola, 8 pages (1997).
*Microprocessor Devices Reliability Monitor Report: Fourth Quarter 1997*, Motorola, 10 pages (1997).
*MIPS Technologies, Inc. Files Lawsuit to Protect Intellectual Property Rights*, at http://www.mips.com/pressReleases/102899B.html, 2 pages (Oct. 28, 1999).
*MIPS Technologies, Inc. Litigation Overview and Q&A*, at http://www.mips.com/pressReleases/102899D.html, 3 pages (visited Feb. 24, 2000).
*MIPS: Open Letter from John Bourgoin, CEO, MIPS Technologies*, at http://www.mips.com/pressReleases/102899C.html, 2 pages (visited Feb. 24, 2000).
*QML-DSP/MCM and Die Courier*, at http://www.ti.com/sc/docs/military/liter/ecour/dsp.htp, 7 pages (Jan. 1996).
*Reliability Monitor Environmental Stress Data 3Q97*, Motorola, 1997,4 pages.
*Reliability and Quality Report 3Q97*, Motorola, 1997, 2 pages.
*Reliability and Quality Report 4Q97*, Motorola, 1997, 2 pages.
Running the MC88110 in *Lockstep, Motorola Semiconductor Engineering Bulletin, Motorola*, 1992, 2 pages.
*TMS320C80 Digital Signal Processor*, Texas Instruments, Jul. 1984, 5 Pages.
*Fairchild CLIPPER™ 32-Bit Microprocessor User's Manual*, Prentice-Hall, Inc., Englewood Cliffs, New Jersey (1987).
Clipper architecture: Information from Answers.com at http://www.answers.com/topic/clipper-architecture. 4 pages (retrieved Jul. 25, 2006).
Dhem, J.F and Feyt, N., "Hardware and Software Symbiosis Helps Smart Card Evolution" [online]. IEEE Micro, Nov.-Dec. 2001, pp. 14-25 [Retrieved on Feb. 1, 2006]. Retrieved from the Internet: <URL: http://www.it.iitb.ac.in/~satish/Thesis%20Report%20New%201/2_Review%20of%/20literature/2_reference/2_29_Hardware%20and%20software%20symbiosis%20helps%20smart%20card%20evolution.pdf>.
Dhem, J.F and Feyt, N., "Present and Future Smart Cards" [online]. Gemplus - Card Security Group, pp. 1-9 [Retrieved on Feb. 1, 2006]. Retrieved from the Internet: <URL: http://www.it-c.dk/courses/DSK/F2003/smart2.pdf>.
English language abstract for Japanese Patent Publication No. 11-174955 titled "Open Key Ciphering Device, Open Key Ciphering and Deciphering Device, and Deciphering Program Recording Medium," inventors Uchiyama et al., published Jul. 2, 1999.
English language abstract for Japanese Patent Publication No. 2000-293507 titled "Device and Method for Generating Expression Data in Operation of Finite Field," inventor Atsushi Kogure, published Oct. 20, 2000.
English language abstract for Japanese Patent Publication No. 2000-321979 titled "Polynomial Arithmetic Device, Device for Calculating Order of Elliptic Curve, Device for Generating Elliptic Curve, and Cryptographic System for Elliptic Curve," inventor Yuichi Fuda, published Nov. 24, 2000.
English language abstract for Japanese Patent Publication No. 11-003226 titled "Visual Instruction Set for CPU Having Integrated Graphics Function," inventor Robert Yung, published Jan. 6, 1999.
European Search Report cited in Application No. 02706275.1 - 2212 / 1386224 dated Oct. 23, 2008.
K.H. Leung, et al., "FPGA Implementation of a Microcoded Elliptic Curve Cryptographic Processor," IEEE, 2000, pp. 68-76.
"Galois Field Polynomial Generator Function Register", Texas Instruments, Oct. 1, 2000, 113 Pages.
Craig Hansen, "Architecture of a Broadband Mediaprocessor," 1996 IEEE Proceedings of COMPCON '96, pp. 334-340.
*88410 Second Level Cache*, Microprocessor Forum, Motorola Inc., Nov. 1991, 20 pages (Bates Nos. L00622-L00641).
Bier, J., "DSP16xxx Targets Communications Apps," *Microprocessor Repor*, MicroDesign Resources, Sep. 15, 1997, pp. 11-15.
European Search Report from European Appl. No. EP 02 71 7430, dated Feb. 16, 2006, 3 pages.
Diefendorff, K., and Allen, M., "Organization of the Motorola 88110: A Superscalar RISC Microprocessor," Motorola Inc., date unknown, pp. 40-63 (Bates Nos. L00642-L00653).
Drescher, W., and Fettweis, G., "VLSI Architectures for Multiplication in GF(2m) for Application Tailored Digital Signal Processors," in VLSI Signal Processing, IX, San Francisco, California, USA (Oct. 30 - Nov. 1, 1996), IEEE, Piscataway, New Jersey, USA, pp. 55-64.
Drescher, W., et al., "VLSI Architecture for Datapath Integration of Arithmetic Over GF(2m) on Digital Signal Processors," in IEEE International Conference on Acoustics, Speech, and Signal Processing, Munich, Germany (Apr. 21-24, 1997), IEEE, Los Alamitos, California, USA, pp. 631-634.
El-Sharkawy, Mohamed, Ph.D., *Digital Signal Processing Applications with Motorola's DSP56002 Processo*, Prentice Hall PTR, 1996, pp. 43-124 (Bates Nos. L06519-L06601).
Gwennap, L., "Digital, MIPS Add Multimedia Extensions," *Microprocessor Report* MicroDesign Resources, vol. 10, No. 15, Nov. 18, 1996, pp. 24-28.
Gwennap, L., "UltraSparc Adds Multimedia Instructions," *Microprocessor Report*, MicroDesign Resources, vol. 8, No. 16, Dec. 5, 1994, pp. 1-3.
Hays, Pat, *LX5280 High-Performance RISC-DSP for IP Licensing*, at http://www.lexra.com/presentation/, 27 pages. Jun. 8, 1999).
IBM Technical Disclosure Bulletin, "Pipelined Hardware Multiplier with Extended Precision," vol. 23, Issue 9, pp. 4322-4323 (Feb. 1, 1981).
INTERSIL Data Sheet. "HS-RTX2010RH: Radiation Hardened Real Time Express Microcontroller," [online] Mar. 2000, [Retrieved on Feb. 16, 2006] Retrieved from the Internet: <URL: httpl://www.intersil.com/data/fn/fn3961.pdf> (36 pages).
Lee, Ruby, "Accelerating Multimedia with Enhanced Microprocessors," IEEE Micro, IEEE, Apr. 1995, pp. 22-32 (Bates Nos. L08566-L08576).
LX5280 Seminar Slides, date unknown, 49 pages.
Patent Abstracts of Japan, Publication No. JP11203106 (Jul. 30, 1999), English Language Abstract for JP Patent Application No. JP19980005096 (Jan. 13, 1998).
Patent Abstracts of Japan, Publication No. JP4142618 (May 15, 1992), English Language Abstract for JP Patent Application No. JP 19900264991 (Oct. 4, 1990).
Patent Abstracts of Japan, Publication No. JP61223938 (Oct. 4, 1986), English Language Abstract for JP Patent Application No. JP19850063782 (Mar. 29, 1985).
Patent Abstracts of Japan, Publication No. JP8314717 (Nov. 29, 1996), English Language Abstract for JP Patent Application No. JP19960146619 (May 16, 1996).
Patent Abstracts of Japan, Publication No. JP2003533829T (Nov. 11, 2003), English Language Abstract for JP Patent Application No. JP20010585439T (May 7, 2001).
Peleg, A., and Weiser, U., "MMX Technology Extension to the Intel Architecture," IEEE Micro, IEEE< Aug. 1996, pp. 42-50 (Bates Nos. L07222-L07230).
*Piccolo - The Arm Signal Processing Architecture*, at http://calab.cs.pusan.kr/TechnicalReport . . . , 12 pages (visited Mar. 6, 2001).
Texas Instruments Application Report, "The MSP430 Harware Multiplier, Functions and Applications," [online] Apr. 1999, [Retrieved on Feb. 16, 2006] Retrieved from the Internet: <URL: http://focus.ti.com/lit/an/s1aa042.pdf> (34 pages).

TMS32010 User's Guide, Texas Instruments Incorporated, 1983, p. 1183.

Turley, J., "TI's New C6x DSP Screams at 1,600 MIPS," Microprocessor Report, Feb. 17,1997, pp. 1-4.

Walter Hollingsworth et al., "The Clipper Processor: Instruction Set Architecture and Implementation," Communications of the ACM, vol. 32, No. 2, pp. 200-219, ACM, Feb. 1989.

Yarlagadda, Krishna, "Lexra Adds DSP Extensions," MicroDesign Resources, Inc., vol. 13, Issue 11, Aug. 23, 1999, pp. 19-21 (printed from West database, 6 pages).

Heinrich, J., *MIPS R4000 Microprocessor User's Manual*, Second Edition, MIPS Technologies, Inc., 1994, pp. 154, 155, 157, 159, 161, 168, 170, 171, B-9, B-10, B-13, B-17, B-19, B-21, B-23, B-27, B-38, B-40 and B-62.

IBM Technical Disclosure Bulletin, "Bit-Manipulation Facility for a Parallel Architecture," vol. 34, No. 7A, Dec. 1991; pp. 387-390.

Digital Equipment Corporation, VAX 11/780 Architecture Handbook, 1977. pp. 6-39 to 6-41.

"Galois Field Polynomial Generator Function Register" *TMS320C6000 CPU And Instruction Set Reference Guide*, Texas Instruments, Oct. 1, 2000, p. 2-26.

European Search Report issued in European Patent Application No. EP 02 706 275.1, on Jun. 30, 2009 (3 pages).

"Galois Held Polynomial Generator Function Register," TMS320C6000 CPU and Instruction Set Reference Guide, Texas Instruments, Oct. 2000 (Oct. 1, 2000), pp. 2-26, XP007905833.

Hansen C., Ed - Institute of Electrical and Electronics Engineers: "Architecture of a broadband mediaprocessor" Digest of Papers of COMPCON (Computer Society Conference) 1996 Technologies for the Information Superhighway. Santa Clara, Feb. 25 - 28, 1996; (Digest of Papers of the Computer Society Computer Conference COMPCON), Los Alamitos, IEEE Comp. Soc. Press, vol. Conf. 41, Feb. 25, 1996, pp. 334-340, XP010160918 ISBN: 978-0-8186-7414-3.

L-Eung K. H. et al., "FPGA implementation of a microcoded elliptic curve cryptographic processor" Field-Programmable Custom Computing Machines, 2000 IEEE Symposium on Napa Valley, CA, USA April 17-19, 2000, Los Alamitos, CA, USA, IEEE Comput. Soc, US, Apr. 17, 2000, pp. 68-76, XP01 0531926 ISBN: 978-0-7695-0871-9.

\* cited by examiner

MICROPROCESSOR INSTRUCTIONS FOR PERFORMING POLYNOMIAL ARITHMETIC OPERATIONS

CROSS-REFERENCE TO RELATED APPLICATIONS

This application is related to the following applications, each of which is being filed concurrently with this application and is incorporated by reference: (1) U.S. application Ser. No. 09/788,683, now U.S. Pat. No. 7,237,097 titled "Partial Bitwise Permutations"; (2) U.S. application Ser. No. 09/788,670, titled "Binary Polynomial Multiplier"; (3) U.S. application Ser. No. 09/788,682, now U.S. Pat. No. 7,162,621 titled "Configurable Instruction Sequence Generation"; and (4) U.S. application Ser. No. 09/788,685, now U.S. Pat. No. 7,181,484, titled "Extended-Precision Accumulation of Multiplier Output".

TECHNICAL FIELD

This invention relates to microprocessor instructions for performing polynomial arithmetic, and more particularly to microprocessor instructions for performing polynomial multiplications.

BACKGROUND

Reduced instruction set computer (RISC) architectures were developed as industry trends tended towards larger, more complex instruction sets. By simplifying instruction set designs, RISC architectures make it easier to use techniques such as pipelining and caching, thus increasing system performance.

RISC architectures usually have fixed-length instructions (e.g., 16-bit, 32-bit, or 64-bit), with few variations in instruction format. Each instruction in an instruction set architecture (ISA) may have the source registers always in the same location. For example, a 32-bit ISA may always have source registers specified by bits 16-20 and 21-25. This allows the specified registers to be fetched for every instruction without requiring any complex instruction decoding.

SUMMARY

Cryptographic systems ("cryptosystems") are increasingly used to secure transactions, to encrypt communications, to authenticate users, and to protect information. Many private-key cryptosystems, such as the Digital Encryption Standard (DES), are relatively simple computationally and frequently reducible to hardware solutions performing sequences of XORs, rotations, and permutations on blocks of data. Public-key cryptosystems, on the other hand, may be mathematically more subtle and computationally more difficult than private-key systems.

While different public-key cryptography schemes have different bases in mathematics, they tend to have a common need for integer computation across very large ranges of values, on the order of 1024 bits. This extended precision arithmetic is often modular (i.e., operations are performed modulo a value range), and in some cases binary polynomial instead of twos-complement. For example, RSA public-key cryptosystems use extended-precision modular exponentiation to encrypt and decrypt information and elliptic curve cryptosystems use extended-precision modular polynomial multiplication.

Public-key cryptosystems have been used extensively for user authentication and secure key exchange, while private-key cryptography has been used extensively to encrypt communication channels. As the use of public-key cryptosystems increases, it becomes desirable to increase the performance of extended-precision modular arithmetic calculations.

In one general aspect, an instruction set architecture includes an instruction for performing polynomial arithmetic. The instruction includes one or more opcodes that identify the instruction as an instruction for performing a polynomial arithmetic operation. Additionally, the instruction identifies one or more registers. The instruction may be processed by performing the polynomial arithmetic operation using the identified registers.

Implementations may provide an instruction for performing binary polynomial addition, which may be implemented using a multiplier. The result of a polynomial arithmetic operation may be stored in one or more result registers. Polynomial arithmetic operations may include multiplication, where the contents of identified registers are multiplied together. Operations also may include polynomial multiplication-addition, where the contents of identified registers are multiplied together and then added to one or more result registers. The result registers may include a high-order register and a low-order register. Polynomial arithmetic operations may be performed on polynomials stored in registers. The polynomials may be encoded as a binary representation of coefficients.

The details of one or more implementations are set forth in the accompanying drawings and the description below. Other features and advantages will be apparent from the description and drawings, and from the claims.

DETAILED DESCRIPTION

Many public-key cryptosystems use extended-precision modular arithmetic to encrypt and decrypt data. For example, many elliptic curve (EC) cryptosystems heavily use binary polynomial multiplication and addition to encrypt and decrypt data. Performance of elliptic curve cryptosystems may be enhanced by modifying a programmable CPU multiplier to be responsive to newly defined instructions dedicated to polynomial operations.

When using elliptic curves defined over $GF(2^{163})$ (as recommended by the IEEE 1363-2000 standard), the main operation needed is multiplication over the field $GF(2^{163})$. Each of the $2^{163}$ elements can be represented as a polynomial of degree at most 163 with coefficients equal to 0 or 1. In this representation, two elements may be added using a simple bitwise XOR and two polynomials, $a(X)$ and $b(X)$, may be multiplied by computing $a(X)b(X) \bmod P(X)$, where the product $a(X)b(X)$ is a 326-degree polynomial, and $P(A)$ is an irreducible polynomial as specified by the IEEE 1363-2000 standard.

Polynomial multiplication has the same form as modular multiplication, ab mod p, over the integers, except that: (1) regular addition is replaced by an XOR; and (2) regular 32-bit multiplication is replaced by a 32-bit carry-free multiplication. Therefore, polynomial modular multiplication may be performed using shifts and XORs instead of shifts and adds.

Figure 1:
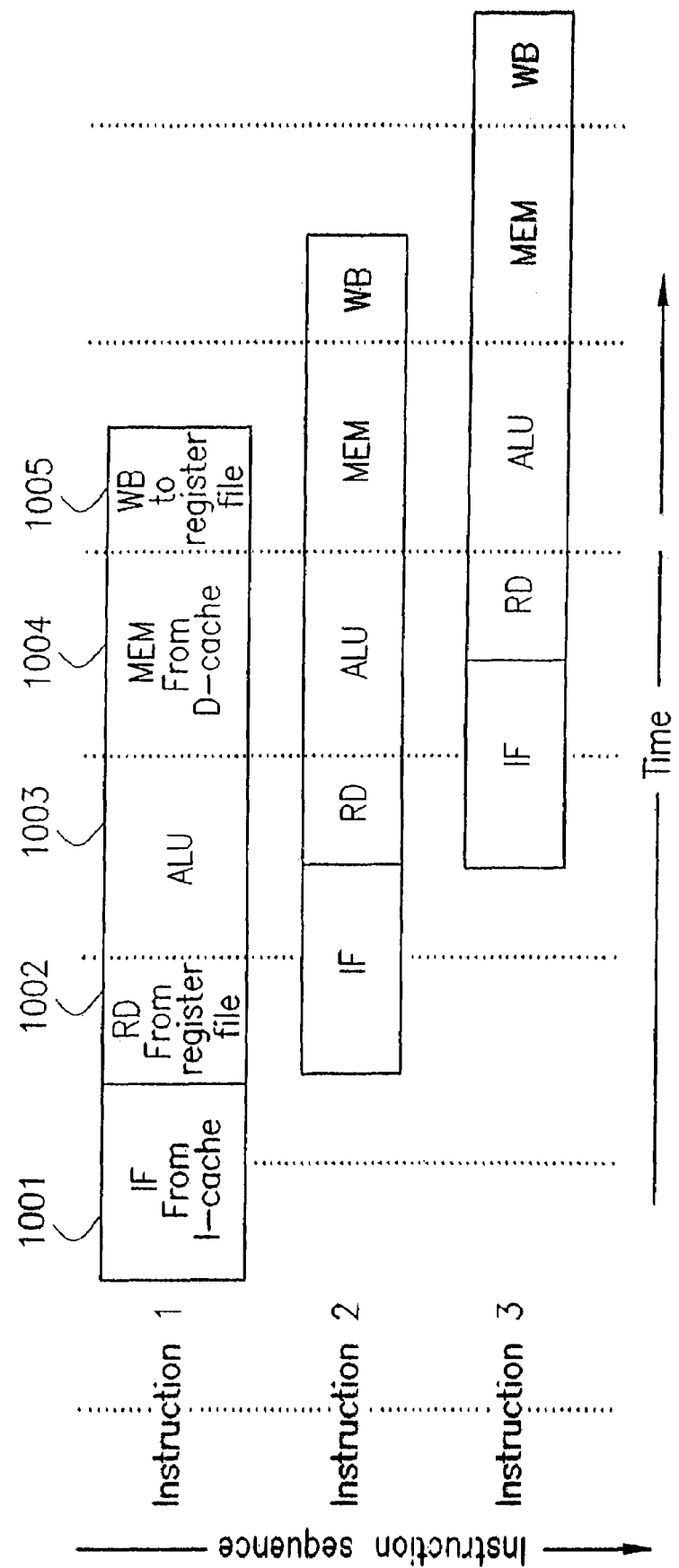
FIG. 1 is a block diagram of an exemplary five-stage pipeline that may be used in a RISC architecture.

Referring to FIG. 1, an exemplary microprocessor architecture that may be used to implement polynomial multiplication includes a five-stage pipeline in which an instruction may be issued each clock cycle and executed in a fixed amount of time, such as, for example, five clock cycles. The execution of each instruction is divided into five stages: instruction fetch (IF) stage 1001, register read (RD) stage 1002, arithmetic/logic unit (ALU) stage 1003, memory (MEM) stage 1004, and write back (WB) stage 1005. In the IF stage 1001, a specified instruction is fetched from an instruction cache. A portion of the fetched instruction is used to specify source registers that may be used in executing the instruction. In the read registers (RD) stage 1002, the system fetches the contents of the specified source registers. These fetched values may be used to perform arithmetic or logical operations in the ALU stage 1003. In the MEM stage 1004, an executing instruction may read/write memory in a data cache. Finally, in the WB stage 1005, values obtained by the execution of the instruction may be written back to a register.

Because some operations, such as floating point calculations and integer multiply/divide, cannot always be performed in a single clock cycle, some instructions merely begin execution of an instruction. After sufficient clock cycles have passed, another instruction may be used to retrieve a result. For example, when an integer multiply instruction takes five clock cycles, one instruction may initiate the multiplication calculation, and another instruction may load the results of the multiplication into a register after the multiplication has completed. If a multiplication has not completed by the time a result is requested, the pipeline may stall until the result is available.

Figure 2:
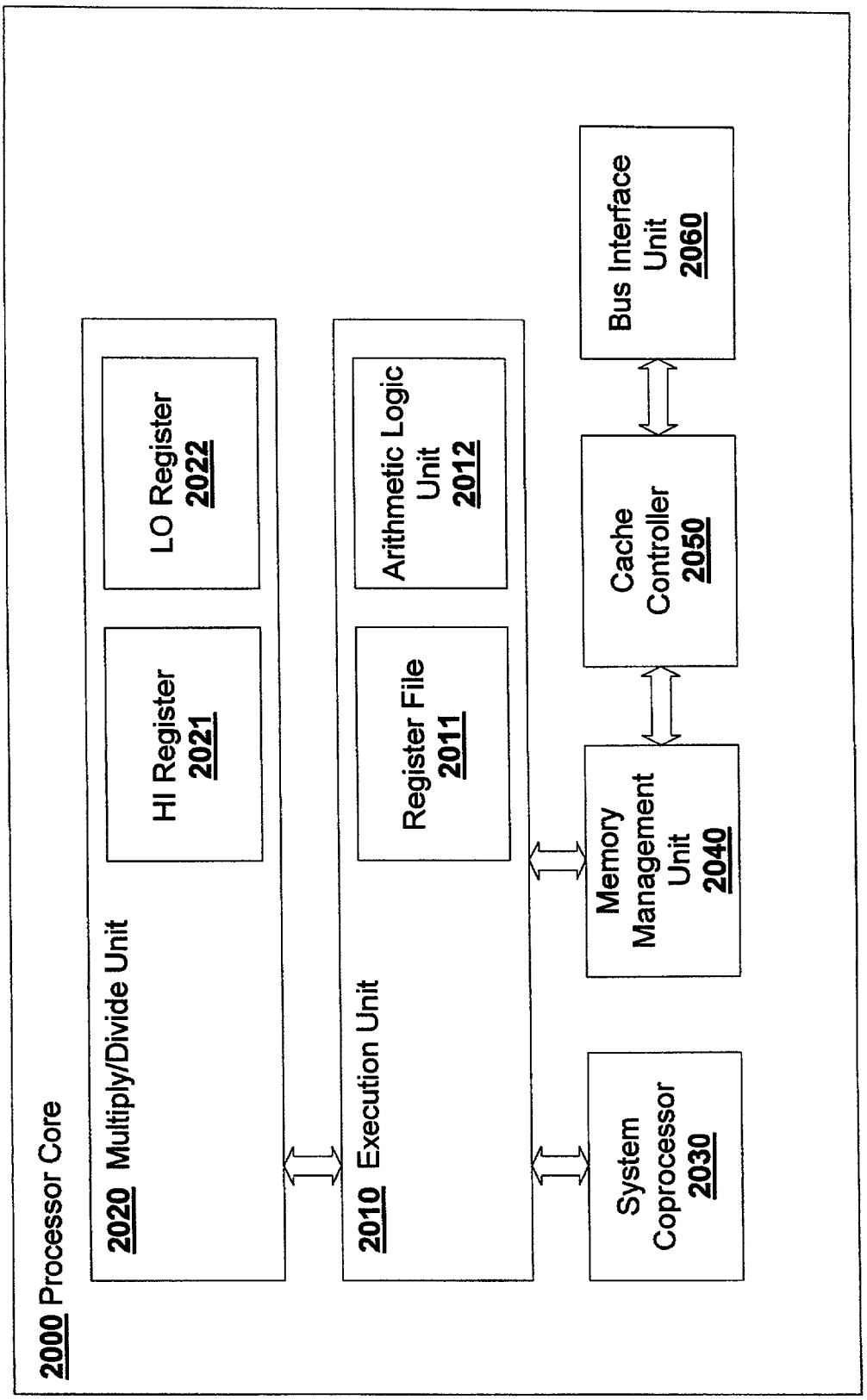
FIG. 2 is a block diagram of a processor core including an execution core and a multiply/divide unit.

Referring to FIG. 2, an exemplary RISC architecture is provided by way of example. The processor core 2000 (also referred to as "microprocessor core") includes the following: an execution unit 2010, a multiply/divide unit (MDU) 2020, a system control coprocessor (CP0) 2030, a memory management unit 2040, a cache controller 2050, and a bus interface unit (BIU) 2060.

Execution unit 2010 is the primary mechanism for executing instructions within processor core 2000. Execution unit 2010 includes a register file 2011 and an arithmetic logic unit (ALU) 2012. In one implementation, the register file 2011 includes thirty-two 32-bit general-purpose registers that may be used, for example, in scalar integer operations and address calculations. The register file 2011, which includes two read ports and one write port, may be fully bypassed to minimize operation latency in the pipeline. ALU 2012 supports both logical and arithmetic operations, such as addition, subtraction, and shifting.

The MDU 2020 performs multiply and divide operations. In one implementation, the MDU 2020 includes a 32-bit by 16-bit (32×16) Booth-encoded multiplier (not shown), result-accumulation registers (HI register 2021 and LO register 2022), a divide state machine, and all multiplexers and control logic required to perform these functions. In one pipelined implementation, 32×16 multiply operations may be issued every clock cycle to MDU 2020, so that a 32-bit number may be multiplied by a 16-bit number every clock cycle. However, the result will not be available in the HI/LO registers (2021 and 2022) until the multiplication has finished. The result may be accessed with the instructions MFHI and MFLO. These instructions move results from the HI register 2021 and LO register 2022, respectively, to an indicated register. For example, "MFHI $7" moves the contents of the HI register 2021 to general purpose register $7.

Two instructions, multiply-add (MADD/MADDU) and multiply-subtract (MSUB/MSUBU), may be used to perform the multiply-add and multiply-subtract operations. The MADD instruction multiplies two numbers and then adds the product to the current contents of the HI register 2021 and the LO register 2022. The result then is stored in the HI/LO registers (2021 and 2022). Similarly, the MSUB instruction multiplies two operands and then subtracts the product from the HI register 2021 and the LO register 2022, storing the result in the HI/LO registers (2021 and 2022). The instructions MADD and MSUB perform operations on signed values. MADDU and MSUBU perform the analogous operations on unsigned values.

Figure 3A:
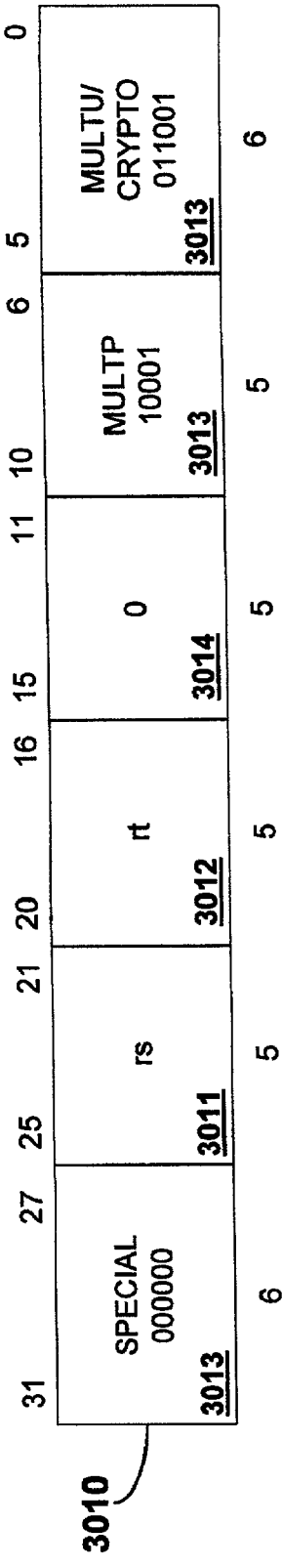
FIGS. 3A and 3B are instruction encodings for exemplary instructions performing polynomial multiplication and addition.

Referring to FIG. 3A, an exemplary instruction encoding of a multiply-polynomial (MULTP) instruction 3010 is provided. The MULTP instruction 3010 has two register fields, rs 3011 and rt 3012, that specify the source registers containing polynomials to be multiplied. After the multiplication is complete, the result is stored in the HI register 2021 and the LO register 2022. The MULTP instruction 3010 also may include one or more opcodes 3013 that identify the operation to be performed. In some implementations a portion of the instruction field, such as, for example, field 3014, may be unused.

In one implementation, the registers identified by rs 3011 and rt 3012 contain binary polynomials (i.e., the polynomial's coefficients are reduced modulo two). Thus, each coefficient is either a "1" or a "0". The polynomials are encoded in a 32-bit register with each bit representing a polynomial coefficient. For example, the polynomial "$x^4+x+1$" would be encoded as "10011" because the coefficients of $x^3$ and $X^2$ are "0" and the remaining coefficients are "1".

The MULTP instruction 3010 permits two polynomials to be multiplied. For example, $(x^4+x+1)(x+1)=x^5+x^4+x^2+2x+1$. Reducing the polynomial modulo two, yields $x^5+x^4+x^2+1$. If the polynomials are encoded in the binary representation above, the same multiplication may be expressed as (10011)(11)=110101.

The sizes of the instruction and the operands may be varied arbitrarily; the 32-bit design described is merely by way of example. In a 32-bit implementation, a 32-bit word value stored in rs 3011 may be polynomial-basis multiplied by a 32-bit word value stored in rt 3012, treating both operands as binary polynomial values, to produce a 64-bit result. The low-order 32-bit word may be placed in LO register 2022, and the high-order 32-bit word result may be placed in HI register 2021. In some implementations, no arithmetic exceptions may occur. If the registers specified by rs 3011 and rt 3012 do not contain 32-bit sign-extended values, the result of the operation may be unpredictable.

Figure 3B:
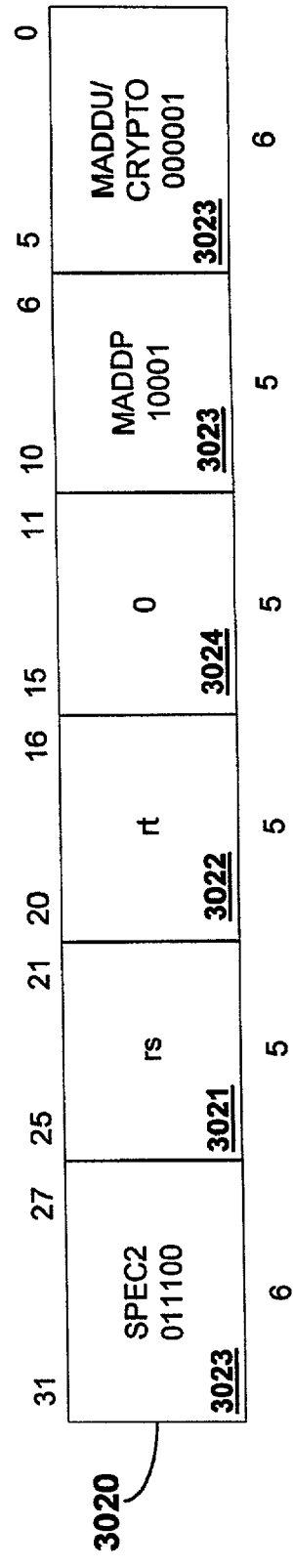

Referring to FIG. 3B, an exemplary instruction encoding of a multiply-add-polynomial (MADDP) instruction 3020 is provided. The MADDP instruction 3020 has two parameter fields, rs 3021 and rt 3022, that specify the source registers containing polynomials to be multiplied and polynomial-basis added (XORed) to the contents of HI 2021 and LO 2022. After the multiplication and addition are complete, the result is stored in the HI register 2021 and the LO register 2022. The MADDP instruction 3020 also may include one or more opcodes 3023 that identify the operation to be performed. In some implementations, a portion of the instruction field, such as, for example, field 3024, may be unused.

The MADDP instruction 3020 performs multiplication as discussed above. Binary polynomial addition is analogous to a bitwise XOR. For example, the binary polynomial addition $(x^4+x+1)+(x+1)$ gives $x^4+2x+2$. Reducing the coefficients modulo 2 yields $x^4$, which may be expressed as "10000".

Similarly, the sizes of the instruction and the operands may be varied arbitrarily. In one implementation, a 32-bit word value stored in rs 3021 may be polynomial-basis multiplied by a 32-bit word value stored in rt 3022, treating both operands as binary polynomial values, to produce a 64-bit result. This result then may be polynomial-basis added to the contents of the HI register 2021 and the LO register 2022. The 64-bit result includes a low-order 32-bit word and a high-order 32-bit word. The low-order 32-bit word may be placed in LO register 2022, and the high-order 32-bit word result may be placed in HI register 2021. If the registers specified by rs 3021 and rt 3022 do not contain 32-bit sign-extended values, the result of the operation may be unpredictable.

In addition to polynomial arithmetic implementations using hardware (e.g., within a microprocessor or microcontroller), implementations also may be embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the systems and techniques may be embodied as a combination of hardware and software. Accordingly, other implementations are within the scope of the following claim.

What is claimed is:

1. A hardware microprocessor that executes an instruction having one or more opcodes, wherein execution of the instruction causes the microprocessor to perform a polynomial arithmetic operation, comprising:
   a first register to store a first set of bits corresponding to coefficients of a binary representation of a first polynomial;
   a second register to store a second set of bits corresponding to coefficients of a binary representation of a second polynomial;
   a high-order result register to store a third set of bits corresponding to coefficients of a high-order portion of a binary representation of a third polynomial and a low-order result register to store a fourth set of bits corresponding to coefficients of a low-order portion of the binary representation of the third polynomial;
   a shift register; and
   logic configured to multiply the contents of the first and second registers using the shift register to obtain an intermediate value, and to add the contents of the high-order result register to a high-order portion of the intermediate value, and the contents of the low-order result register to a low-order portion of the intermediate value to obtain a result.

2. The hardware microprocessor of claim 1 wherein a high-order portion of the result is stored in the high-order result register and a low-order portion of the low-order result register.

3. The hardware microprocessor of claim 1 wherein the instruction is part of a RISC instruction set.

4. The hardware microprocessor of claim 1 wherein the multiplication is performed using modulo two arithmetic.

5. The hardware microprocessor of claim 1 wherein the addition is performed using modulo two arithmetic.

6. The hardware microprocessor of claim 1 wherein the multiplication and the addition are performed using modulo two arithmetic.

7. A method for performing polynomial arithmetic using an instruction, the method comprising:
   storing in a first register a first set of bits corresponding to coefficients of a binary representation of a first polynomial;
   storing in a second register a second set of bits corresponding to coefficients of a binary representation of a second polynomial;
   receiving the instruction, the instruction including one or more opcodes identifying the instruction as an instruction for performing a polynomial arithmetic operation on polynomials represented by respective sets of binary polynomial coefficients
   multiplying the contents of the first and second registers using a shift register to obtain an intermediate value in response to receiving the instruction;
   adding the contents of a high-order result register having stored therein coefficients corresponding to a high-order portion of a binary representation of a third polynomial to a high-order portion of the intermediate value to obtain a high-order portion of the result; and
   adding the contents of a low-order result register having stored therein coefficients corresponding to a low-order portion of the binary representation of the third polynomial to a low-order portion of the intermediate value to obtain a low-order portion of the result.

8. The method of claim 7 wherein the instruction is part of an instruction set, and the instruction set comprises a RISC instruction set.

9. The method of claim 7, further comprising performing the multiplication using modulo two arithmetic.

10. The method of claim 7, further comprising performing the addition using modulo two arithmetic.

11. The method of claim 7, further comprising;
    performing the multiplication using modulo two arithmetic; and
    performing the addition using modulo two arithmetic.

12. The method of claim 7, further comprising:
    writing a high-order portion of the result to the high-order result register; and
    writing a low-order portion of the result to the low-order result register.

13. A method for performing polynomial arithmetic in an encryption or decryption process, comprising:
    storing in a first register a first set of bits corresponding to coefficients of a binary representation of a first polynomial;
    storing in a second register a second set of bits corresponding to coefficients of a binary representation of a second polynomial;

multiplying the contents of the first and second registers using a shift register to obtain an intermediate value;

adding the intermediate value to the contents of a high-order result register and a low-order result register to obtain a result, the result comprising a set of bits that corresponds to coefficients of a binary representation of a polynomial that results from the multiplying and adding; and reading the result for use in the encryption or decryption process.

14. The method of claim 13, further comprising executing an instruction that identifies the first and second registers, the execution of which performs the polynomial arithmetic, wherein the instruction is part of a RISC instruction set.

15. The method of claim 13, further comprising performing the multiplication using modulo two arithmetic.

16. The method of claim 13, further comprising performing the addition using modulo two arithmetic.

17. The method of claim 13, further comprising:
performing the multiplication using modulo two arithmetic; and
performing the addition using modulo two arithmetic.

18. The method of claim 13, further comprising:
writing a high-order portion of the result to the high-order result register; and
writing a low-order portion of the result to the low-order result register.

19. A hardware microprocessor that executes one or more instructions for performing polynomial arithmetic, the microprocessor comprising:
an execution unit that processes a fetched instruction; and
a polynomial arithmetic unit used by the execution unit in processing the fetched instruction if the fetched instruction is one of the one or more instructions for performing polynomial arithmetic on polynomials represented by respective sets of binary polynomial coefficients, wherein each set of binary polynomial coefficients includes one or more bits with each bit in the set representing a different term of one of the polynomials and wherein the polynomial arithmetic unit is configured to perform a binary polynomial multiplication-addition operation by performing a binary polynomial multiplication using a shift register to determine an intermediate result and adding the intermediate result to contents of a high-order result register and a low-order result register to generate a result polynomial represented by a result set of binary polynomial coefficients that includes one or more bits with each bit in the result set representing a different term of the result polynomial,
wherein the fetched instruction comprises:
an opcode identifying the fetched instruction as an instruction for performing the binary polynomial multiplication-addition operation, and
two register identifiers associated with two respective registers of a register file that contain two respective polynomials, represented by respective sets of binary polynomial coefficients, multiplied in said binary polynomial multiplication.

20. The hardware microprocessor of claim 19 wherein the polynomial arithmetic unit is a component of a multiply/divide unit.

21. The hardware microprocessor of claim 19, wherein the fetched instruction is part of a RISC instruction set.

22. The hardware microprocessor of claim 19, wherein the binary polynomial multiplication is performed using modulo two arithmetic.

23. The hardware microprocessor of claim 19, wherein the addition is performed using modulo two arithmetic.

24. The hardware microprocessor of claim 19, wherein the binary polynomial multiplication and the addition are performed using modulo two arithmetic.

25. A computer-readable medium that comprises at least one of a semiconductor, a magnetic medium, and an optical medium, and having computer-readable program code stored thereon for enabling a computer to multiply a first and second polynomial to create an intermediate value and add the intermediate value to a third polynomial, the computer-readable program code comprising:
first computer-readable program code for causing the computer to load each of two sets of binary polynomial coefficients representing the first and second respective polynomials into two respective registers of a register file, wherein each set of binary polynomial coefficients includes one or more bits with each bit in the set representing a different term of one of the first and second polynomials;
second computer-readable program code including an instruction having:
one or more opcodes identifying the instruction as an instruction for performing a polynomial arithmetic operation on the first and second polynomials; and
two register identifiers specifying the two respective registers
wherein execution of the instruction by the computer causes the computer to multiply the first and second polynomials using a shift register to produce the intermediate value, add the intermediate value to a third polynomial to produce a result polynomial represented by a result bit set having a set of bits corresponding to coefficients of a binary representation of the result polynomial, and to write high-order portion of the result bit set to the high-order result register, and a low-order portion of the result bit set to the low-order result register.

26. The computer-readable medium of claim 25, wherein the instruction is part of a RISC instruction set.

27. The computer-readable medium of claim 25, wherein the multiplication is performed using modulo two arithmetic.

28. The computer-readable medium of claim 25, wherein the addition is performed using modulo two arithmetic.

29. The computer-readable medium of claim 25, wherein the multiplication and the addition are performed using modulo two arithmetic.

30. A hardware microprocessor that executes an instruction having one or more opcodes, wherein execution of the instruction causes the microprocessor to perform a polynomial arithmetic operation-comprising:
a first register to store a first set of bits corresponding to coefficients of a binary representation of a first polynomial;
a second register to store a second set of bits corresponding to coefficients of a binary representation of a second polynomial;
a high-order result register to store coefficients corresponding to a high-order portion of a binary representation of a third polynomial and a low-order result register to store coefficients corresponding to a low-order portion of the binary representation of the third polynomial, and
logic configured to perform an arithmetic operation on the contents of the first and second registers using a shift register to obtain an intermediate value and to add the contents of the high-order result register and the low-order result register to the intermediate value to obtain a result.

31. The hardware microprocessor of claim 30 wherein a high-order portion of the result is stored in the high-order result register and a low-order portion of the result is stored in the low-order result register.

32. The hardware microprocessor of claim 30 wherein the instruction set is part of a RISC instruction set.

33. The hardware microprocessor of claim 30, wherein the addition is performed using modulo two arithmetic.

34. A method for performing polynomial arithmetic using an instruction, the method comprising:
  receiving the instruction, the instruction including one or more opcodes identifying the instruction as an instruction for performing a polynomial arithmetic operation;
  storing in a first register a first set of bits corresponding to coefficients of a binary representation of a first polynomial;
  storing in a second register a second set of bits corresponding to coefficients of a binary representation of a second polynomial;
  performing an arithmetic operation on the contents of the first and second registers using a shift register to obtain an intermediate value;
  adding the contents of a high-order result register and a low-order result register to the intermediate value to obtain a result; and
  writing a high-order portion of the result to the high-order result register and a low-order portion of the result to the low-order result register, wherein the high-order result register contains a set of bits corresponding to a high-order portion of a binary representation of the result and the low-order result register contains a set of bits corresponding to a low-order portion of a binary representation of the result.

35. The method of claim 34 wherein the instruction is part of an instruction set, and the instruction set comprises a RISC instruction set.

36. The method of claim 34, further comprising performing the arithmetic operation on the contents of the first and second registers using modulo two arithmetic.

37. The method of claim 34, further comprising performing the addition using modulo two arithmetic.

38. The method of claim 34, further comprising:
  performing the arithmetic operation on the contents of the first and second registers using modulo two arithmetic; and
  performing the addition using modulo two arithmetic.

39. A method for performing polynomial arithmetic in an encryption or decryption process, comprising:
  storing in a first register a first set of bits corresponding to coefficients of a binary representation of a first polynomial;
  storing in a second register a second set of bits corresponding to coefficients of a binary representation of a second polynomial;
  performing an arithmetic operation on the contents of the first and second registers using a shift register to obtain an intermediate value;
  adding the intermediate value to the contents of a high-order result register and a low-order result register to obtain a result, the result comprising a set of bits that corresponds to coefficients of a binary representation of a polynomial that results from the multiplying and adding; and
  reading the result for use in the encryption or decryption process.

40. The method of claim 39, further comprising executing an instruction that identifies the first and second registers, the execution of which performs the polynomial arithmetic, wherein the instruction is part of an instruction set, and the instruction set comprises a RISC instruction set.

41. The method of claim 39, further comprising performing the arithmetic operation on the contents of the first and second registers using modulo two arithmetic.

42. The method of claim 39, further comprising performing the addition using modulo two arithmetic.

43. The method of claim 39, further comprising:
  performing the arithmetic operation on the contents of the first and second registers using modulo two arithmetic; and
  performing the addition using modulo two arithmetic.

44. The method of claim 39, further comprising:
  writing a high-order portion of the result in the high-order result register; and
  writing a low-order portion of the result in the low-order result register.

45. A hardware microprocessor that executes one or more instructions for performing polynomial arithmetic, the microprocessor comprising:
  an execution unit that processes a fetched instruction; and
  a polynomial arithmetic unit used by the execution unit in processing the fetched instruction if the fetched instruction is one of the one or more instructions for performing polynomial arithmetic on polynomials represented by respective sets of binary polynomial coefficients, wherein each set of binary polynomial coefficients includes one or more bits with each bit in the set representing a different term of one of the polynomials and wherein the polynomial arithmetic unit is configured to perform a polynomial arithmetic operation using a shift register to determine an intermediate value, followed by an addition of the intermediate value to a third polynomial to produce a result polynomial, the result polynomial comprising a high-order portion having bits corresponding to coefficients of a high-order portion of a binary representation of the result polynomial and a low-order portion having bits corresponding to coefficients of a low-order portion of the binary representation of the result polynomial,
  wherein the fetched instruction comprises:
    an opcode identifying the fetched instruction as an instruction for performing the polynomial arithmetic operation; and
    two register identifiers associated with two respective registers of a register file used in said polynomial arithmetic operation.

46. The hardware microprocessor of claim 45 wherein the polynomial arithmetic unit is a component of a multiply/divide unit.

47. The hardware microprocessor of claim 45, wherein the fetched instruction is part of a RISC instruction set.

48. The hardware microprocessor of claim 45, wherein the polynomial arithmetic operation is performed using modulo two arithmetic.

49. The hardware microprocessor of claim 45, wherein the addition is performed using modulo two arithmetic.

50. The hardware microprocessor of claim 45, wherein the polynomial arithmetic operation and the addition are performed using modulo two arithmetic.

51. A computer-readable medium that comprises at least one of a semiconductor, a magnetic medium, and an optical medium, and having computer-readable program code stored thereon for enabling a computer to perform a polynomial arithmetic operation on a first and second polynomial to create an intermediate value and add the intermediate value to a third polynomial, the computer-readable program code comprising:

first computer-readable program code for causing the computer to load each of two sets of binary polynomial coefficients representing the first and second respective polynomials into two respective registers of a register file, wherein each set of binary polynomial coefficients includes one or more bits with each bit in the set representing a different term of one of the first and second polynomials;

second computer-readable program code including an instruction having:

one or more opcodes identifying the instruction as an instruction for performing the polynomial arithmetic operation on the first and second polynomials; and two register identifiers specifying the two respective registers that contain the sets of binary polynomial coefficients representing the first and second respective polynomials, wherein execution of the instruction by the computer causes the computer to perform the polynomial arithmetic operation on the first and second polynomials using a shift register to produce the intermediate value, to add the intermediate value to a third polynomial to create a result polynomial represented by a result bit set having bits corresponding to coefficients of a binary representation of the result polynomial, and to write bits of the result bit set corresponding to high-order coefficients of the result polynomial to a high-order result register and bits corresponding to low-order coefficients of the result polynomial to a low-order result register.

52. The computer-readable medium of claim 51, wherein the instruction is part of a RISC instruction set.

53. The computer-readable medium of claim 51, wherein the polynomial arithmetic operation on the first and second polynomials is performed using modulo two arithmetic.

54. The computer-readable medium of claim 51, wherein the addition is performed using modulo two arithmetic.

55. The computer-readable medium of claim 51, wherein the polynomial arithmetic operation on the first and second polynomials and the addition are performed using modulo two arithmetic.

* * * * *